Patented Jan. 23, 1940

2,187,883

UNITED STATES PATENT OFFICE 2,187,883

METHOD OF REFINING VISCOUS HYDROCARBON OILS

Norman Edward Lemmon, Hammond, Ind., assignor to Standard Oil Company, Chicago, Ill., a corporation of Indiana No Drawing. Application December 30, 1937, Serial No. 182,565

3 Claims. (Cl. 196—40)

This invention pertains to improvements in refining hydrocarbon oils and, in particular, to improvements in refining petroleum lubricating oils to produce color stable and sludge stable products.

In the refining of petroleum lubricating oils by treatment with sulfuric acid the oils are first agitated with concentrated or fuming sulfuric acid of predetermined strength and quantities, and the acid sludge resulting from such treatment settled and withdrawn. The unneutralized acid-treated oil, commonly referred to in the petroleum art as sour oil, contains finely divided acid sludge material and oil-soluble acid products which must be removed before the oil is suitable for use. The method most commonly used to remove these undesirable products from the acid-treated oil is to neutralize the sour oil with an alkali reagent, such as sodium hydroxide or sodium carbonate solution. Neutralization with these reagents nearly always results in the formation of stable emulsions of the oil-water type which necessitates the use of a demulsifying agent to break them. A suitable demulsifying agent is the water-soluble sulfonic acid soap which is obtained from the acid sludge resulting from the treatment of mineral oil with sulfuric acid. These water-soluble sulfonic acid soaps are commonly referred to in the petroleum industry as green acid soaps. After the separation of the emulsified oil-aqueous phases with the demulsifying agent the oil is washed one or more times with water to remove the soda salts.

Another well known method of neutralizing sour oil is to treat the acid-treated oil with either gaseous ammonia or ammonia solution. By neutralizing sour oils with ammonia, emulsion difficulties are avoided.

In both of these processes, certain oil soluble sulfuric esters are formed which easily decompose and cause the oil to darken.

It is the primary object of this invention to provide a method of treating neutralized sour oil which will produce a finished product resistant to the formation of color and/or sludge. It is a further object of this invention to so treat neutralized sour oils that the finished oil is a stable product which will not become discolored or form sludge.

I have found that neutralized sour oil can be made stable by subjecting the neutralized sour oil to a temperature of about from 350° F. to about 550° F. but preferably from about 400° F. to about 500° F. in the presence of ammonia while agitating the oil with a non-oxidizing medium such as nitrogen, hydrocarbon gases such as natural gas or gases resulting from the pyrolysis of hydrocarbons, and steam or the like.

If the sour oil is neutralized with caustic a small amount of ammonia is introduced into the oil while the same is being heated to temperature. However, if the sour oil is neutralized with ammonia it is unnecessary to add ammonia during the heat treatment of the oil.

Exemplary of my invention, but not limitative thereof, I set forth in detail the preparation of a stable lubricating oil by ammonia neutralization of an acid-treated 50 S. A. E. oil. About 12,000 gallons of a 50 S. A. E. motor oil was treated in the conventional manner with sulfuric acid and, after the withdrawal of the sludge, the oil was held at about 150° F. for a few hours to permit the finely divided sludge to settle out as much as possible. The settled acid-treated oil was then transferred to an agitator and blown with air at a temperature of about 150° F. to remove the sulfur dioxide present therein. The step is not necessary but is advantageous in that it reduces the amount of ammonia needed for neutralization.

After substantially all of the sulfur dioxide had been removed the oil was neutralized with an ammonia solution of about 26° Baumé gravity and the neutralized oil pumped to a still. The oil in the still was heated to a temperature of about 240° F. and then about 30 boiler horsepower of steam per hour per 12,000 gallon of oil was introduced into the oil. Heating was continued while the oil was being blown with steam until a temperature of about 450° F. was reached. When the temperature had reached the desired maximum, namely, 450° F., the heat was cut off and the oil pumped out of the still as rapidly as possible and passed through a cooler and the temperature reduced to about 200° F. before being introduced into the storage tank. Steam was passed through the oil during the entire pumping out period. The time required to bring the oil up to a temperature of about 450° was about 8 hours and the total time from the time the oil was charged into the still until it was completely pumped out of the still was about 10 hours.

After the ammonia neutralized oil was heat treated and steam blown it was diluted with a suitable diluent, such as, for example, Oleum Spirits, and filtered through an absorbent clay to the desired color. The clay filtered oil may be used as such or it may be further processed to dewax the same to obtain an oil of lower cold test.

In the following Table I, I have tabulated comparative data illustrating the result of neutralizing sour oil with ammonia in the manner herein described and by the method heretofore used of neutralizing the sour oil with sodium carbonate and green acid soap.

oil altered due to the distillation of some of the lower boiling fractions.

The data presented in Table III show the effect of the temperature of heat stabilization on the sludge stability of the oil.

TABLE III

| Temperature of heat stabilization with steaming | Sludging time on oil filtered to 3½ N. P. A. |
|---|---|
|  | Hours |
| 250° F | 24¾ |
| 350° F | 32½ |
| 400° F | 32½ |
| 450° F | 36¾ |
| 510° F | 37¾ |

TABLE I

| Oil | 50 S. A. E. oil | 50 S. A. E. oil |
|---|---|---|
| How neutralized | Na₂CO₃ and green acid soap. | Ammonia (heat to 450° F. and steam blow). |
| Grav. of neut. oil—°A. P. I. at 60° F | 26.7 | 26.7. |
| Color stability (before dewaxing): |  |  |
| After 0 hours at 210° F. A. S. T. M | (2½)-3 | (2½)-3. |
| After 48 hours at 210° F. A. S. T. M | 3-3½ | 3-3½. |
| After 165 hours at 210° F. A. S. T. M | 3½-4 | 3½-4. |
| Sludging time of undewaxed oil | 35 hours | 35 hours. |
| Properties of dewaxed oil: |  |  |
| Gravity °A. P. I | 23.6 | 23.6. |
| Viscosity at 210° F | 91.2 | 91.6. |
| Viscosity at 100° F | 1353.9 | 1364.2. |
| Viscosity index | 70.5 | 70.6. |
| Color—A. S. T. M. (taken as true color) | 3.1 | 3.0. |
| Color stability at 210° F.: |  |  |
| After 0 hours at 210° F. A. S. T. M | (3)-3½ | (3)-3½. |
| After 48 hours at 210° F. A. S. T. M | 3½-4 | 3½-4. |
| After 165 hours at 210° F. A. S. T. M | 5 | 5. |
| Sludging time of finished oil | 22¾ hours | 25¾ hours. |

The data presented in the above table clearly illustrate that an equally stable oil is obtained by neutralizing sour oil with ammonia and heating the neutralized oil to a temperature of about 450° F. while blowing with steam as can be obtained by the more expensive and time consuming method of neutralizing the sour oil with an alkali, such as sodium hydroxide or sodium carbonate, and demulsifying the resultant neutralized product with a demulsifying agent such as green acid soap.

The effect of heating the ammonia neutralized oil to a temperature of about 450° F. while steam blowing and the effect of merely neutralizing sour oil with ammonia as has been done heretofore is shown in the following Table II.

TABLE II

| Oil | 50 S. A. E. oil | 50 S. A. E. oil |
|---|---|---|
| How neutralized | NH₃ | NH₃. |
| Heat treatment | None | Heated to 450° F. and steam blow. |
| Condition of unfiltered stock | Not color stable | Color stable. |
| Condition of filtered stock | Unstable | Stable. |
| Color of oil after reduction | 3½-4 A.S.T.M. | 3-3½ A. S. T. M. |
| Color of oil after heating at 210° F. for 48 hours | 4-4½ | 3½. |
| Color of oil after heating at 210° F. for 165 hours | 8 | 4-4½. |

I have found that the temperature at which the ammonia neutralized oil is heated is important. Heating the ammonia neutralized oil at temperatures below about 300° F. even while steaming or agitating with an inert non-oxidizing gas does not produce a stable finished oil. Heating the ammonia neutralized oil at temperatures above about 500–550° F. while steaming, or agitation with an inert non-oxiding gas will result in a stable finished oil, but heating at such high temperatures is not desirable since the filter yields are materially decreased and the viscosity of the Agitating the ammonia neutralized oil with an inert non-oxidizing gas such as natural gas while heating to a temperature of 450–500° F. produces a finished oil having substantially the same stability as the ammonia neutralized oil heated to 450–500° F. while steaming. In Table IV I have tabulated comparative results obtained by heat treating an ammonia neutralized oil while agitating with steam and with natural gas.

TABLE IV

*Ammonia-neutralized stabilized at 450° F.*

|  | Steam agitated | Natural gas agitated |
|---|---|---|
| Filter yield/gal./lb. of clay | 0.453 | 0.450. |
| Sludging time—hours | 36.75 | 35.25. |
| Original color of oil | 3½ N. P. A | 3½ N. P. A. |
| Color after 48 hrs. at 210° F | 3½-4 N. P. A | 4 N. P. A. |
| Color after 72 hrs. at 210° F | 4 N. P. A | 4-4½ N. P. A. |
| Color after 120 hrs. at 210° F | 4-4½ N. P. A | 4-4½ N. P. A. |

The above results indicate that steam agitation and agitation with an inert gas produce substantially the same results.

The effect of heat treating caustic neutralized oil in the presence of ammonia is demonstrated by the following example. A Mid-Continent 50 distillate was treated in a diluent with four ½ pound dumps of 104½% sulfuric acid, neutralized with caustic and washed with green acid soap. After the diluent was distilled off the viscous oil had a color of 8 N. P. A. When the diluted oil was heated to a temperature of about 400° F. in the presence of ammonia and the diluent removed the viscous oil had a color of 4½–5 N. P. A., showing a material improvement in color when heated to about 400° F. in the presence of ammonia.

The colors reported in each of the above tables are A. S. T. M. colors determined by the A. S. T. M.

method D155-34T as described on page 64 et seq. of the A. S. T. M. Standards on Petroleum Products and Lubricants of September, 1937.

The sludging time data presented in Tables I and III are the number of hours required to form 10 mgs. of sludge per 10 grams of oil as determined by the Indiana oxidation test described in the Industrial and Engineering Chemistry (Anal. Ed.) vol. 6 No. 6 (November 15, 1934) page 419.

While I have described the invention as applied to the refining of a viscous lubricating oil, it is not to be limited thereto, but is equally well adapted to the refining of other hydrocarbon oils such as electrical insulating oil, turbine oils, medicinal oils, spindle oils and the like.

I claim:

1. The method of refining viscous hydrocarbon oils comprising sulfuric acid treating the viscous hydrocarbon oil, neutralizing the acid-treated oil with caustic soda and subsequently heating the neutralized oil to a temperature of about 350° F. to 550° F. in the presence of ammonia while agitating with an inert fluid.

2. The method of preparing a color and sludge stable viscous hydrocarbon oil which comprises treating a viscous hydrocarbon oil with acid, removing the acid sludge, neutralizing the acid treated oil with caustic soda and subsequently heating the neutralized oil to a temperature of about 350° F. to 550° F. in the presence of ammonia and a non-oxidizing medium.

3. The improvement in the sulfuric acid treatment of viscous hydrocarbon oils which comprises acid treating a viscous hydrocarbon oil, removing the acid sludge resulting from the acid treatment of said oil, agitating the acid treated oil with air at a temperature of about 150° F. whereby the sulfur dioxide present therein is removed, neutralizing the acid treated sulfur dioxide freed oil with caustic soda and finally heating the neutralized oil in the presence of ammonia to a temperature of about 350° F. to about 550° F. while agitating said oil with an inert gas.

NORMAN EDWARD LEMMON.